United States Patent
Sadamitsu et al.

(10) Patent No.: US 9,695,780 B2
(45) Date of Patent: Jul. 4, 2017

(54) INTERNAL COMBUSTION ENGINE

(75) Inventors: Takahiro Sadamitsu, Nisshin (JP); Atsushi Nakagaki, Nagoya (JP); Osamu Maeda, Toyota (JP); Tomoyuki Isogai, Toyota (JP); Tatsuo Iida, Anjo (JP); Koichi Yonezawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 14/365,355

(22) PCT Filed: Mar. 5, 2012

(86) PCT No.: PCT/JP2012/055570
§ 371 (c)(1),
(2), (4) Date: Jun. 13, 2014

(87) PCT Pub. No.: WO2013/132577
PCT Pub. Date: Sep. 12, 2013

(65) Prior Publication Data
US 2015/0020783 A1    Jan. 22, 2015

(51) Int. Cl.
*F02B 47/08*  (2006.01)
*F02M 25/07*  (2006.01)
(Continued)

(52) U.S. Cl.
CPC ....... *F02M 25/0726* (2013.01); *F01D 17/105* (2013.01); *F01M 13/022* (2013.01);
(Continued)

(58) Field of Classification Search
CPC ............... F02B 2075/025; F02B 2700/037; F02B 1/22; F02B 37/16; F01M 2013/027;
(Continued)

(56) References Cited

U.S. PATENT DOCUMENTS

| | | | |
|---|---|---|---|
| 2008/0232952 A1* | 9/2008 | Gu | F04D 27/0215 415/11 |
| 2010/0012103 A1* | 1/2010 | Lewis | F02M 25/06 123/574 |
| 2011/0023850 A1* | 2/2011 | Karlovsky | F01M 13/00 123/573 |

FOREIGN PATENT DOCUMENTS

| | | |
|---|---|---|
| JP | A-2009-133292 | 6/2009 |
| JP | A-2010-174806 | 8/2010 |
| JP | A-2011-7125 | 1/2011 |

* cited by examiner

*Primary Examiner* — Lindsay Low
*Assistant Examiner* — Omar Morales
(74) *Attorney, Agent, or Firm* — Oliff PLC

(57) ABSTRACT

A second recirculation passage recirculates blow-by gas at an upstream section, which is upstream of an impeller of a turbocharger in an intake passage. A first passage branches and extends from a downstream section, which is downstream of the impeller in the intake passage. A second passage that forms part of the second recirculation passage connects the first passage and the upstream section to each other. A third passage, which is provided separately from the second passage, connects the first passage and the upstream section to each other. A change mechanism changes, in different manners, the flow rate of compressed gas recirculating to the upstream section through the second passage, and the flow rate of compressed gas recirculating to the upstream section through the third passage.

13 Claims, 7 Drawing Sheets

(51) Int. Cl.
    *F02B 39/00*     (2006.01)
    *F01M 13/02*     (2006.01)
    *F01D 17/10*     (2006.01)
    *F02B 37/16*     (2006.01)
    *F02M 25/08*     (2006.01)

(52) U.S. Cl.
    CPC .............. *F02B 37/16* (2013.01); *F02B 39/00* (2013.01); *F02M 25/08* (2013.01); *F01M 2013/027* (2013.01); *F05D 2220/40* (2013.01); *F05D 2260/14* (2013.01); *F05D 2260/606* (2013.01); *Y02T 10/144* (2013.01)

(58) Field of Classification Search
    CPC ............... F01M 13/00; F01M 13/0011; F01M 2013/0038; F01M 2013/0044; F01M 13/02; F01M 13/023; F01M 13/022
    USPC .................................. 123/568.12, 574, 41.86
    See application file for complete search history.

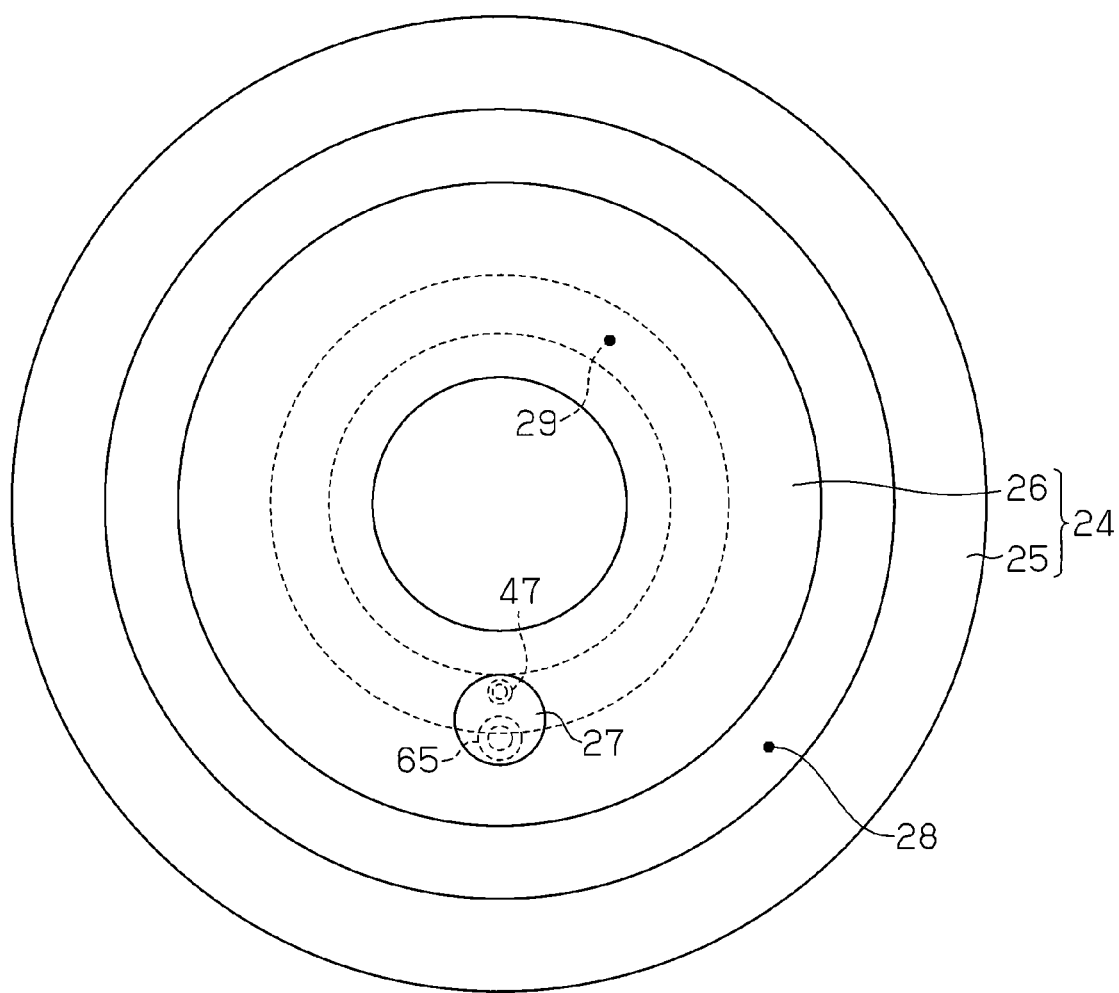

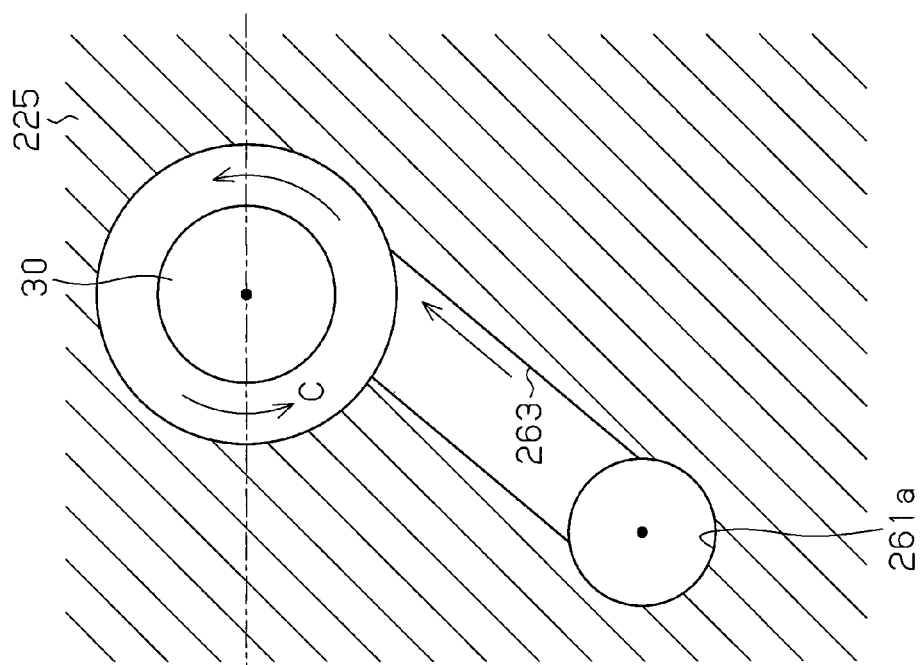
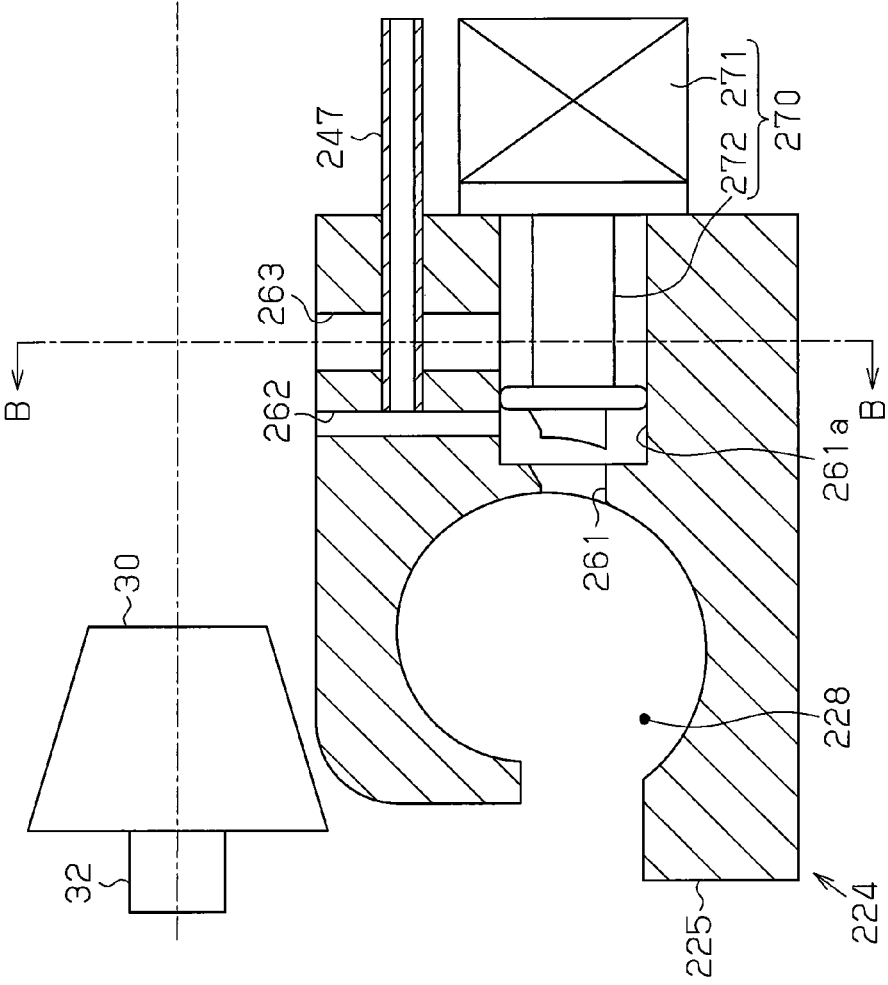

INTERNAL COMBUSTION ENGINE

TECHNICAL FIELD

The present invention relates to an internal combustion engine that includes a turbocharger with a compressor having an impeller arranged in an intake passage and driven with the energy of exhaust gas and a blow-by gas recirculation passage, through which blow-by gas flows back to an upstream section of the intake passage with respect to the impeller.

BACKGROUND ART

An internal combustion engine is conventionally known that includes a turbocharger, which drives an impeller of a compressor with the energy of exhaust gas (see Patent Document 1, for example).

In an internal combustion engine, blow-by gas in a crank case flows back to the intake passage through a blow-by gas recirculation passage. In the case of an internal combustion engine featuring natural aspiration without a turbocharger, specifically in the case of what is referred to as an NA internal combustion engine, a blow-by gas recirculation passage is connected to the intake manifold and blow-by gas is drawn in with negative pressure generated in the intake manifold.

In contrast, in the case of an internal combustion engine with a turbocharger, a downstream section that is downstream of an impeller in the intake passage is subjected to a pressure increase especially during forced induction. Hence, if nothing is done, blow-by gas cannot flow back to the intake passage.

According to the technique described in Patent Document 1, a bypass passage that bypasses the intake passage is provided in the aforementioned downstream section of the intake passage. An ejector mechanism to generate negative pressure is located in the bypass passage. A blow-by gas recirculation passage is connected to the ejector mechanism. More specifically, a valve to adjust the flow rate of compressed gas to flow into the intake passage and a valve to adjust the flow rate of compressed gas to flow into the bypass passage are arranged in a branching portion of the intake passage, at which the intake passage branches into an upstream section of the bypass passage. The degrees of openings of these valves are controlled to adjust the flow rate of the compressed gas to be introduced into the ejector mechanism through the bypass passage, thereby generating negative pressure in the ejector mechanism. This allows blow-by gas to flow back to the intake passage even during forced induction.

An internal combustion engine with a turbocharger includes an air bypass passage connecting a downstream section and an upstream section of an intake passage with respect to an impeller and an air bypass valve that adjusts the flow rate of compressed gas to flow back through the air bypass passage. The degree of opening of this valve is controlled to adjust the flow rate of the compressed gas to flow back to the upstream section of the intake passage. This suppresses generation of surging of the compressor when the throttle valve is closed.

PRIOR ART DOCUMENTS

Patent Documents

Patent Document 1: Japanese Laid-Open Patent Publication No. 2009-133292

SUMMARY OF THE INVENTION

Problems that the Invention is to Solve

In the internal combustion engine with a turbocharger, the downstream section, which is downstream of the impeller in the intake passage, is subjected to pressure increase as described above. Thus, a blow-by gas recirculation passage may be connected to the upstream section, which is upstream of the impeller in the intake passage. Even in this case, blow-by gas still cannot flow back favorably unless something else is done. Therefore, a bypass passage connecting the downstream section and the upstream section of the intake passage to each other may be provided and the blow-by gas recirculation passage may be located in this bypass passage.

In this case, as seen from the foregoing, the following two passages are provided independently around the compressor and its surrounding: the air bypass passage to suppress generation of surging of the compressor; and the bypass passage connected to the blow-by gas recirculation passage. This leads to a complicated structure.

To cope with this problem, with the intention of simplifying the structure, a common bypass passage may be provided to take the place of these two bypass passages targeted for different objectives. However, merely providing one bypass passage, which connects the upstream section and the downstream section of the intake passage to each other, and using this bypass passage entirely as a common passage causes the following different problem. If a valve in the bypass passage is opened with the intention of suppressing generation of surging, for example, a large amount of blow-by gas flows back rapidly to the intake passage.

An objective of the present invention is to provide an internal combustion engine capable of increasing the degree of flexibility in adjusting the flow rate of compressed gas and the flow rate of blow-by gas to flow back to an upstream section of an intake passage with respect to an impeller while enabling common use of part of a passage through which the compressed gas is introduced from a downstream section of the intake passage with respect to the impeller.

Means for Solving the Problems

The following describes means to solve the aforementioned problem and effect achieved by this means.

To achieve the foregoing objective and in accordance with one aspect of the present invention, an internal combustion engine is provided that includes a turbocharger, a blow-by gas recirculation passage, a first passage, a second passage, a third passage, and a change mechanism. The turbocharger is provided with a compressor that has an impeller arranged in an intake passage and is driven by energy of exhaust gas. Through the blow-by gas recirculation passage, blow-by gas flows back to an upstream section, which is upstream of the impeller in the intake passage. The first passage branches off from a downstream section, which is downstream of the impeller in the intake passage. The second passage connects the first passage and the upstream section to each other and forms part of the blow-by gas recirculation passage. The third passage connects the first passage and the upstream section to each other. The third passage is provided separately from the second passage. The change mechanism changes in different manners the flow rate of compressed gas to flow back from the downstream section to the upstream section through the first and second passages and the flow rate of compressed gas to flow back from the downstream section to the upstream section through the first and third passages.

According to this configuration, blow-by gas is drawn from the blow-by gas recirculation passage into the second passage while compressed gas flows back from the downstream section of the intake passage to the upstream section of the intake passage through the first and second passages. Further, compressed gas flows back from the downstream section of the intake passage to the upstream section of the intake passage through the first and third passages. According to the aforementioned configuration, the change mechanism can change the flow rate of compressed gas to flow back to the upstream section of the intake passage through the second passage and the flow rate of compressed gas to flow back to the upstream section of the intake passage through the third passage in different manners. This allows increase of the degree of flexibility in adjusting the flow rate of compressed gas and the flow rate of blow-by gas to flow back to the upstream section of the intake passage while enabling common use of part of a passage through which the compressed gas is introduced from the downstream section of the intake passage.

In this case, the compressor preferably has a compressor housing surrounding the impeller, and the first, second, and third passages are preferably all formed inside the compressor housing.

This configuration shortens the length of each of the passages, so that compressed gas to flow back to the upstream section of the intake passage through each of the passages becomes more responsive.

If these passages are arranged outside the compressor housing, additional components, such as pipes, to form these passages will be required. In contrast, the aforementioned configuration eliminates the need for these additional components, such as pipes, so that the number of components is decreased The change mechanism preferably includes a common valve body shared by the second and third passages.

This configuration provides a common valve body to the change mechanism that changes the flow rate of compressed gas, specifically blow-by gas to flow back to the upstream section of the intake passage through the second passage and the flow rate of compressed gas to flow back to the upstream section of the intake passage through the third passage in different manners. This simplifies the configuration of the change mechanism, compared to a configuration where a valve body for the second passage and a valve body for the third passage are provided separately.

In this case, the change mechanism preferably has: a first mode, where connection between the first and second passages and connection between the first and third passages are both cut; a second mode, where a degree of connection between the first and second passages is changed continuously in accordance with the position of the valve body while connection between the first and third passages is cut; and a third mode, where a degree of connection between the first and third passages is changed continuously in accordance with the position of the valve body while a degree of connection between the first and second passages is at its maximum.

According to this configuration, when the valve body is at a position within a region corresponding to the first mode, compressed gas does not flow back through the second and third passages. When the valve body is at a position within a region corresponding to the second mode, the flow rate of blow-by gas to flow back through the second passage is changed in accordance with the position of the valve body. When the valve body is at a position within a region corresponding to the third mode, the flow rate of blow-by gas to flow back through the third passage is changed in accordance with the position of the valve body.

In response to changing the second mode to the third mode by displacing the valve body toward a side at which the valve body is opened, compressed gas having flowed back through the first and second passages then flows back through the third passage. This reduces the flow rate of blow-by gas to flow back through the second passage. As a result, the flow rate of blow-by gas to flow back through the second passage is reduced while the flow rate of compressed gas to flow back through the third passage is increased. This restrains a large amount of blow-by gas from flowing back to the upstream section of the intake passage while allowing a large amount of compressed gas to flow back to the upstream section of the intake passage through the third passage with the intention of preventing surging of the compressor.

In this case, the second and third passages preferably each have a connection portion connected to the first passage, and the connection portion of the second passage and the connection portion of the third passage are preferably arranged side by side. Further, the valve body is preferably provided in a manner that allows displacement of the valve body in the direction in which the connection portions of the second and third passages are arranged, and the connection portion of the second passage is preferably closer to a side at which the valve body is closed than the connection portion of the third passage.

According to this configuration, displacing the valve body in a closed state toward a side at which the valve body is opened makes a change from the first mode to the second mode. Then, blow-by gas flows back to the upstream section of the intake passage through the second passage. Displacing the valve body further toward the side at which the valve body is opened makes a change from the second mode to the third mode. Then, compressed gas flows back to the upstream section of the intake passage through the third passage.

In this case, the third passage preferably has a flow passage area larger than that of the second passage.

According to this configuration, changing the second mode to the third mode by displacing the valve body toward the side at which the valve body is opened rapidly increases the flow rate of compressed gas to flow back through the first and third passages and can rapidly reduce the flow rate of compressed gas to flow back through the second passage.

In this case, the connection portion of the second passage preferably has an elongated shape extending in the direction in which the valve body is displaced.

This configuration allows fine adjustment of the degree of connection between the first and second passages in accordance with the position of the valve body. As a result, the flow rate of blow-by gas to flow back through the second passage is adjusted accurately.

The blow-by gas recirculation passage preferably has an upstream section that is located upstream of a part to which the second passage is connected, and the change mechanism preferably includes a supply mechanism that supplies some of compressed gas introduced through the first passage to the upstream section of the blow-by gas recirculation passage when the valve body is at a predetermined position within a region corresponding to the third mode.

According to this configuration, some of compressed gas to be introduced through the first passage is supplied to the blow-by gas recirculation passage through the supply mechanism. This removes adherents such as oil inside the blow-by gas recirculation pipe at an early stage.

In this case, the supply mechanism preferably includes a branching pipe, which branches off from the upstream section of the blow-by gas recirculation passage, and a movable pipe, which communicates with the first passage and is provided integrally with the valve body. When the valve body is at the predetermined position, the movable pipe communicates with a tip end of the branching pipe.

According to this configuration, the valve body at the predetermined position makes communication between the movable pipe and the branching pipe. Hence, some of compressed gas from the first passage is supplied through the movable pipe and the branching pipe to the blow-by gas recirculation passage. Further, the degree of connection between the movable pipe and the branching pipe is changed in accordance with the position of the valve body, thereby allowing fine adjustment of the pressure of compressed gas to be supplied through the movable pipe and the branching pipe.

The compressor preferably has a compressor housing surrounding the impeller, and the compressor housing preferably has a diffuser surface exposed to the intake passage and a cooling chamber formed inside the compressor housing and on the back side of the diffuser surface. Further, the cooling chamber preferably forms part of the blow-by gas recirculation passage and is located upstream of the second passage in the blow-by gas recirculation passage.

Increasing forced induction pressure with the intention of enhancing engine performance increases intake air temperature after forced induction. This increases the temperature of the diffuser surface of the compressor housing so that oil deposits may collect easily on this diffuser surface. Accordingly, the collection of the oil deposits imposes limits on the forced induction pressure so that the upper limit thereof may be restricted to a low level.

In this regard, in the aforementioned configuration, blow-by gas inside the cooling chamber is drawn into the second passage while compressed gas flows back through the second passage. At this moment, the inside of the cooling chamber is cooled as a result of adiabatic expansion. This cools the diffuser surface of the compressor housing to suppress collection of oil deposits on the diffuser surface. This suppresses the occurrence of a problem in that the upper limit of forced induction pressure will be restricted to a low level due to limits imposed by collection of oil deposits. Further, blow-by gas to flow back to the upstream section of the intake passage becomes lower in temperature to reduce the temperature of air to flow into the impeller. This improves the efficiency of the forced induction.

In this case, the second passage is preferably provided with a nozzle portion, which tapers the second passage such that the second passage gets thinner from a connection portion between the first and second passages toward a connection portion between the cooling chamber and the second passage.

According to this configuration, when flowing back through the second passage, compressed gas passes through the nozzle portion. This increases the velocity of flow of the compressed gas while reducing the pressure of the compressed gas. Hence, negative pressure can be generated favorably at a connection portion of the second passage with the cooling chamber. Thus, a larger amount of blow-by gas is drawn favorably into the second passage. This achieves accurate cooling of the inside of the cooling chamber, thereby cooling the diffuser surface favorably.

In these cases, the compressor housing preferably has a housing body and a diffuser portion separated from the housing body. The diffuser portion has the diffuser surface, and the cooling chamber is formed between the diffuser portion and the housing body.

This configuration easily forms the cooling chamber inside the compressor housing.

BRIEF DESCRIPTION OF THE DRAWINGS

FIG. 3 is a plan view showing the structure of the compressor housing as viewed in the direction of arrow A of FIG. 2;

FIG. 7(a) is a cross-sectional view showing the structure in cross section of a compressor; and FIG. 7(b) is a cross-sectional view showing the structure in cross section taken along line B-B of FIG. 7(a).

MODES FOR CARRYING OUT THE INVENTION

An internal combustion engine according to a first embodiment of the present invention will now described with reference to FIGS. 1 to 4.

Figure 1:
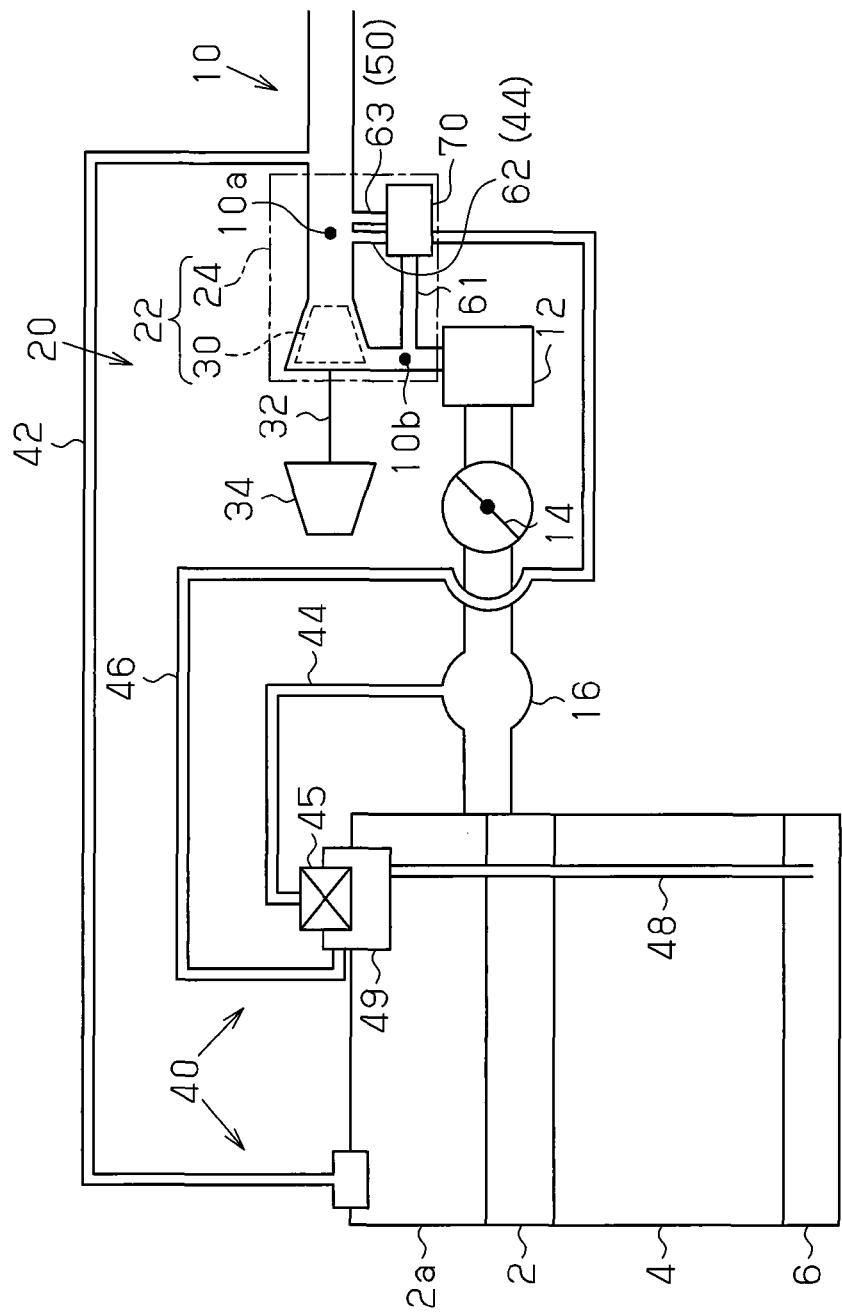
FIG. 1 is a schematic diagram showing the entire structure of an internal combustion engine according to a first embodiment of this invention.

As shown in FIG. 1, the internal combustion engine includes a cylinder head 2, a cylinder block 4, and a crank case 6. A head cover 2a is attached to the top of the cylinder head 2.

An intake passage 10, which introduces air into each cylinder, is connected to the cylinder head 2.

The intake passage 10 is provided with a compressor 22, an intercooler 12, a throttle valve 14, and an intake manifold 16, which are arranged in this order as viewed from the upstream side.

The compressor 22 has an impeller 30 arranged in the intake passage 10 and a compressor housing 24 surrounding the impeller 30. A section of the intake passage 10 upstream of the impeller 30 is referred to as an upstream section 10a, and a section of the intake passage 10 downstream of the impeller 30 is referred to as a downstream section 10b.

A turbine 34, more specifically a turbine wheel is coupled through a shaft 32 to the impeller 30. The turbine 34, the shaft 32, and the compressor 22 form a turbocharger 20. Driving the turbine 34 with the energy of exhaust gas rotates the impeller 30 of which the shaft is coupled to the turbine wheel.

The internal combustion engine is provided with a blow-by gas recirculation unit 40 that causes blow-by gas in the crank case 6 to flow back to the intake passage 10.

The blow-by gas recirculation unit 40 includes a fresh air introduction passage 42, a first recirculation passage 44, a second recirculation passage 46, and an upstream recirculation passage 48.

The fresh air introduction passage 42 connects the upstream section 10a of the intake passage 10 and the inside of the head cover 2a to each other. Air introduced from the upstream section 10a into the head cover 2a through the fresh air introduction passage 42 passes through a passage formed in the cylinder head 2 and the cylinder block 4, and then enters the crank case 6.

The upstream recirculation passage 48 has an open basal end positioned inside the crank case 6 and a tip end connected to the entrance of an oil separator 49 provided to the head cover 2a. The oil separator 49 is a labyrinth oil separator.

The first recirculation passage 44 connects the exit of the oil separator 49 and the intake manifold 16 to each other. The connection portion between the oil separator 49 and the first recirculation passage 44 is provided with an electrically-operated metering valve 45 to meter the amount of blow-by gas to flow back to the intake manifold 16 through the first recirculation passage 44.

The second recirculation passage 46 is a passage connecting the exit of the oil separator 49 and the upstream section 10a of the intake passage 10 to each other. The connection portion between the oil separator 49 and the second recirculation passage 46 is not provided with a metering valve.

The internal combustion engine is provided with an air bypass passage 50 connecting the downstream section 10b and the upstream section 10a of the intake passage 10 to each other.

Figure 2:
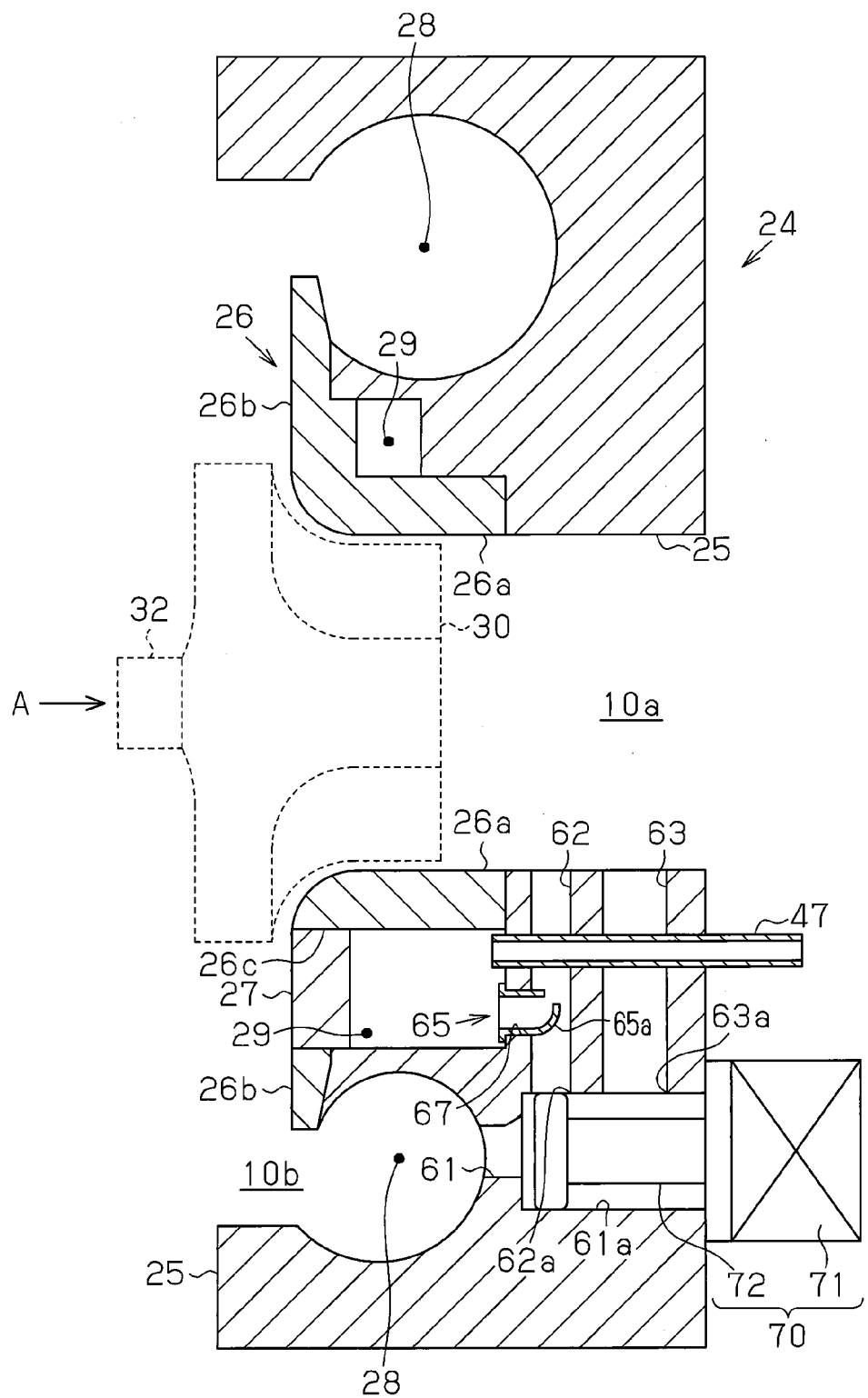
FIG. 2 is a cross-sectional view showing the structure in cross section of a compressor housing of the first embodiment.

The structure of the compressor housing 24 will be described next by referring to FIGS. 2 and 3. FIG. 2 is a cross-sectional view of the compressor housing 24. FIG. 3 is a plan view of the compressor housing 24 as viewed in the direction of arrow A of FIG. 2. Unless otherwise specified, the left side of FIG. 2 will be referred to as a basal end, and the right side of FIG. 2 will be referred to as a tip end.

As shown in FIG. 2, the compressor housing 24 has a housing body 25 and a shroud piece 26, which is formed separately from the housing body 25.

The housing body 25 is substantially cylindrical and has a substantially annular scroll passage 28 extending around the outer circumference of the impeller 30.

The shroud piece 26 is substantially cylindrical. The shroud piece 26 has a shroud surface 26a facing the impeller 30 in a radial direction of the impeller 30 and a diffuser surface 26b extending outwardly in the radial direction of the impeller 30 from the basal end of the shroud surface 26a. The shroud piece 26 is attached to the inner circumferential surface of the housing body 25 from the basal end of the shroud piece 26. The shroud surface 26a and the diffuser surface 26b are exposed to the intake passage 10.

The housing body 25 is provided with a first passage 61 having an opening formed in the inner wall of the scroll passage 28 while extending toward the tip end to penetrate through the housing body 25. Specifically, the first passage 61 branches off from the downstream section 10b of the intake passage 10. A tip end 61a of the first passage 61 is formed into columnar space larger in diameter than the space at the basal end of the first passage 61.

The housing body 25 is provided with two passages (a second passage 62 and a third passage 63), each of which has an opening formed in the inner wall of the first passage 61 (in FIG. 2, the upper part of the inner wall) while extending inwardly in the radial direction and through the housing body 25. Specifically, the second and third passages 62, 63 have respective openings at the inner circumferential surface of the housing body 25.

In the below, a portion of the second passage 62 connected to the tip end 61a of the first passage 61 will be referred to as a second connection portion 62a, and a portion of the third passage 63 connected to the tip end 61a of the first passage 61 will be referred to as a third connection portion 63a.

The second and third connection portions 62a and 63a are arranged side by side in the axial direction of the impeller 30. The second and third connection portions 62a and 63a are each formed into an elongated shape extending in the axial direction. The third passage 63 has a flow passage area larger than that of the second passage 62.

The tip end 61a of the first passage 61 houses a valve body 72 that can be displaced in the axial direction of the impeller 30. The valve body 72 is coupled to an electrically-operated actuator 71 to reciprocate the valve body 72 in the axial direction. Specifically, the valve body 72 is arranged in a manner that allows displacement of the valve body 72 in a direction in which the second and third connection portions 62a and 63b are arranged. The second connection portion 62a is closer to the basal end (where the valve body 72 is closed) than the third connection portion 63a. The actuator 71 and the valve body 72 form a change mechanism 70.

As shown in FIGS. 2 and 3, a cooling chamber 29 being annular space about the rotary axis of the impeller 30 is formed inside the compressor housing 24, more specifically between the shroud piece 26 and the housing body 25 and on the back side of the diffuser surface 26b of the shroud piece 26. The cooling chamber 29 is connected to a recirculation pipe 47 forming part of the second recirculation passage 46. In the housing body 25, a communication hole 67 is formed between the cooling chamber 29 and the second passage 62. An ejector piece 65 is attached to the communication hole 67. Specifically, the cooling chamber 29 forms part of the second recirculation passage 46 and is located upstream of the second recirculation passage 46 with respect to the second passage 62. The diffuser surface 26b of the shroud piece 26 is provided with a through hole 26c passing through the cooling chamber 29. The through hole 26c is closed by a stopper member 27. The connection portion of the cooling chamber 29 with the recirculation pipe 47, the ejector piece 65, and the through hole 26c (stopper member 27) are all located in the same position as seen in the circumferential direction.

The ejector piece 65 is substantially cylindrical. Part of the ejector piece 65 arranged radially outside of the impeller 30 forms a nozzle portion 65a. The nozzle portion 65a is arranged in the second passage 62. The nozzle portion 65a is curved to approach the inside in the radial direction of the impeller 30 as the distance from the tip end of the nozzle portion 65a decreases. The nozzle portion 65a tapers the second passage 62 such that the second passage 62 gets thinner from the second connection portion 62a toward a connection portion between the second passage 62 and the cooling chamber 29. The ejector piece 65 is fitted from the side of the cooling chamber 29 into the communication hole 67 toward the second passage 62. A basal end portion of the ejector piece 65 is provided with a flange for retention of the ejector piece 65.

The recirculation pipe 47, the cooling chamber 29, the ejector piece 65, and the second passage 62 together form part of the second recirculation passage 46. The first and third passages 61 and 63 form the air bypass passage 50.

The change mechanism 70 has the following three modes to be changed in accordance with the position of the valve body 72 in the aforementioned axial direction.

Figure 4A:
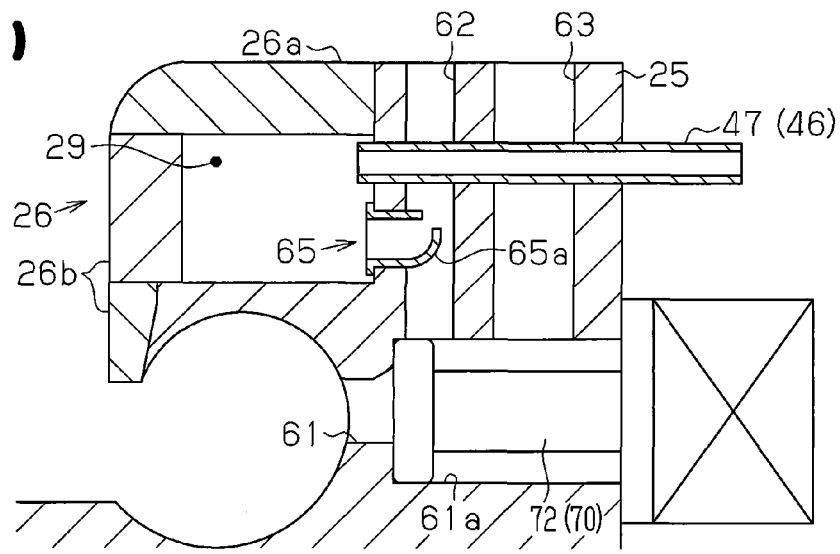
FIG. 4(a) is a cross-sectional view showing the structure in cross section about a cooling chamber of the compressor housing taken in a first mode.

As shown in FIG. 4(a), in a first mode, the valve body 72 is closest to the basal end (where the valve body 72 is closed), and connection between the tip end 61a of the first passage 61 and the second connection portion 62a and connection between the tip end 61a of the first passage 61 and the third connection portion 63a are both cut.

Figure 4B:
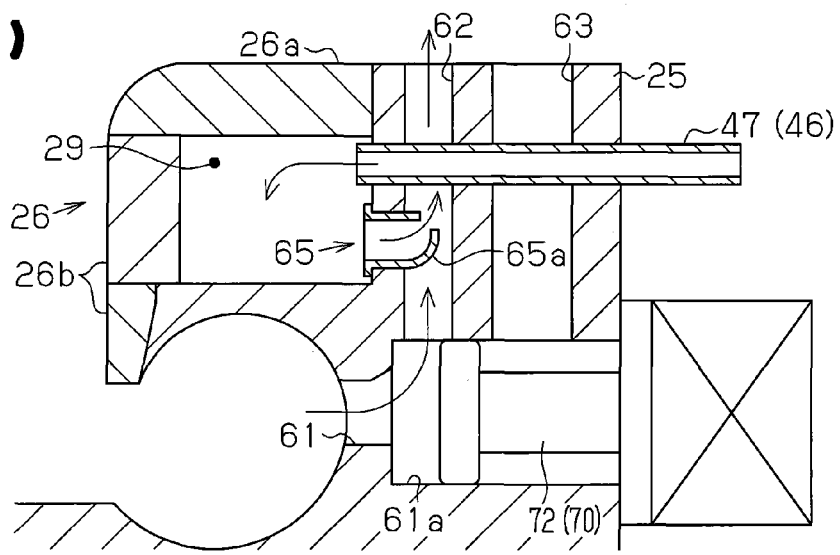
FIG. 4(b) is a cross-sectional view like FIG. 4(a), taken in a second mode.

As shown in FIG. 4(b), displacement of the valve body 72 from the position in the first mode toward the tip end (corresponding to the base end of the valve body 72) makes a change to a second mode. In the second mode, while connection between the tip end 61a of the first passage 61 and the third connection portion 63a is cut, the degree of connection (flow passage area) of the second connection portion 62a with the first passage 61 is changed continuously in accordance with the position of the valve body 72. Specifically, as the valve body 72 is displaced toward the tip end, the degree of connection (flow passage area) between the tip end 61a of the first passage 61 and the second connection portion 62a is increased. This changes the flow rate of compressed gas to flow back from the downstream section 10b of the intake passage 10 to the upstream section 10a of the intake passage 10 through the first and second passages 61 and 62.

Figure 4C:
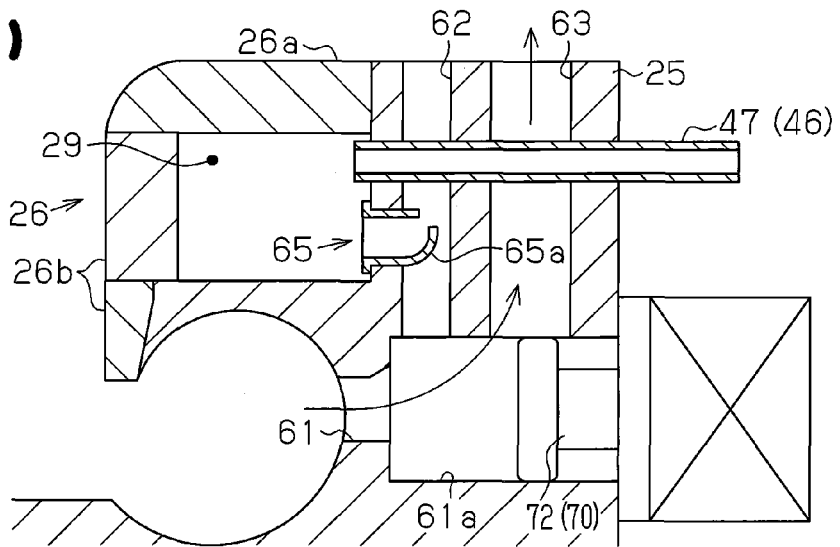
FIG. 4(c) is a cross-sectional view like FIG. 4(a), taken in a third mode.

As shown in FIG. 4(c), displacement of the valve body 72 from the position in the second mode toward the tip end (corresponding to the basal end of the valve body 72) makes a change to a third mode. In the third mode, while the degree of connection between the tip end 61a of the first passage 61 and the second connection portion 62a is at its maximum, the degree of connection (flow passage area) of the third connection portion 63a with the first passage 61 is changed continuously in accordance with the position of the valve body 72. Specifically, as the valve body 72 is displaced toward the tip end, the degree of connection (flow passage area) between the tip end 61a of the first passage 61 and the third connection portion 63a is increased. This changes the flow rate of compressed gas to flow back from the downstream section 10b of the intake passage 10 to the upstream section 10a of the intake passage 10 through the first and third passages 61 and 63.

Operation of the first embodiment will now be described next by referring to FIG. 4.

As shown in FIG. 4(a), when the valve body 72 is at a position within a region corresponding to the first mode, compressed gas does not flow back through the second and third passages 62 and 63.

As shown in FIG. 4(b), when the valve body 72 is at a position within a region corresponding to the second mode, blow-by gas is drawn from the recirculation pipe 47 and the cooling chamber 29 into the second passage 62 while compressed gas flows back to the upstream section 10a of the intake passage 10 through the second passage 62. More specifically, when flowing back through the second passage 62, the compressed gas passes through the nozzle portion 65a of the ejector piece 65. This increases the velocity of flow of the compressed gas while reducing the pressure of the compressed gas. Hence, negative pressure is generated at a connection portion of the second passage 62 with the ejector piece 65, so that the blow-by gas is drawn favorably into the second passage 62. The flow rate of the blow-by gas to flow back through the second passage 62 is changed in accordance with the position of the valve body 72.

As shown in FIG. 4(c), when the valve body 72 is at a position within a region corresponding to the third mode, the flow rate of compressed gas to flow back through the third passage 63 is changed in accordance with the position of the valve body 72.

In this way, the change mechanism 70 adjusts the position of the valve body 72, thereby changing, in different manners, the flow rate of compressed gas, specifically blow-by gas to flow back to the upstream section 10a of the intake passage 10 through the second passage 62 and the flow rate of compressed gas to flow back to the upstream section 10a of the intake passage 10 through the third passage 63.

In response to changing the second mode to the third mode by displacing the valve body 72 toward a side at which the valve body 72 is opened, compressed gas having flowed back through the first and second passages 61 and 62 then flows back through the third passage 63. The third passage 63 has a flow passage area larger than that of the second passage 62. This particularly acts to rapidly increase the flow rate of compressed gas to flow back through the first and third passages 61 and 63 while rapidly reducing the flow rate of compressed gas to flow back from the first and second passages 61 and 62.

As seen from the foregoing, while the flow rate of compressed gas to flow back through the third passage 63 is increased, the flow rate of blow-by gas to flow back through the second passage 62 can be reduced rapidly. This restrains a large amount of blow-by gas from flowing back to the upstream section 10a of the intake passage 10 while allowing a large amount of compressed gas to flow back to the upstream section 10a of the intake passage 10 through the third passage 63 with the intention of preventing surging of the compressor 22.

Increasing forced induction pressure with the intention of enhancing engine performance increases intake air temperature after forced induction. This increases the temperature of the diffuser surface of the compressor housing so that oil deposits may collect easily on this diffuser surface. Accordingly, the collection of the oil deposits imposes limits on forced induction pressure so that an upper limit thereof may be restricted to a low level.

In this regard, in the first embodiment, the inside of the cooling chamber 29 is cooled as a result of adiabatic expansion when blow-by gas is drawn into the second passage 62. This cools the diffuser surface 26b of the compressor housing 24 to suppress collection of oil deposits on the diffuser surface 26b.

At this moment, blow-by gas to flow back to the upstream section 10a of the intake passage 10 becomes lower in temperature, so that the temperature of air to flow into the impeller 30 becomes lower.

The aforementioned internal combustion engine of the first embodiment achieves the following advantages.

(1) The internal combustion engine includes the turbocharger 20 with the compressor 22 and the second recirculation passage 46. The compressor 22 has the impeller 30, which is arranged in the intake passage 10 and driven with the energy of exhaust gas. Blow-by gas flows back to the upstream section 10a through the second recirculation passage 46. The upstream section 10a is upstream of the impeller 30 in the intake passage 10. The internal combustion engine includes the first passage 61, the second passage 62, and the third passage 63. The first passage 61 branches off from the downstream section 10b, which is downstream of the impeller 30 in the intake passage 10. The second passage 62 connects the tip end 61a of the first passage 61 and the upstream section 10a of the intake passage 10 to each other while forming part of the second recirculation passage 46. The third passage 63 connects the tip end 61a of the first passage 61 and the upstream section of the intake passage 10 with respect to the impeller 30 while being provided separately from the second passage 62. The internal combustion engine includes the change mechanism 70, which changes, in different manners, the flow rate of compressed gas to flow back from the downstream section 10b of the intake passage 10 to the upstream section 10a of the intake passage 10 through the first and second passages 61 and 62 and the flow rate of compressed gas to flow back from the downstream section 10b of the intake passage 10 to the upstream section 10a of the intake passage 10 through the first and third passages 61 and 63. This structure allows increase of the degree of flexibility in adjusting the flow rate of compressed gas and the flow rate of blow-by gas to flow back to the upstream section 10a of the intake passage 10 while enabling common use of part of a passage through which the compressed gas is introduced from the downstream section 10b of the intake passage 10.

(2) The first, second, and third passages 61, 62, and 63 are all formed inside the compressor housing 24. This structure shortens the length of each of the passages 61, 62, and 63, so that compressed gas to flow back to the upstream section 10a of the intake passage 10 through each of the passages 61, 62, and 63 becomes more responsive. If these passages are arranged outside the compressor housing, additional components such as pipes to form these passages should be required. In contrast, the aforementioned structure eliminates the need for these additional components such as pipes, so that the number of components can be decreased.

(3) The change mechanism 70 includes the valve body 72 shared by the second and third passages 62 and 63. This structure provides the common valve body 72 to the change mechanism 70, which changes, in different manners, the flow rate of compressed gas, specifically blow-by gas to flow back to the upstream section 10a of the intake passage 10 through the second passage 62 and the flow rate of compressed gas to flow back to the upstream section 10a of the intake passage 10 through the third passage 63. This simplifies the structure of the change mechanism 70, compared to a structure where a valve body for the second passage 62 and a valve body for the third passage 63 are provided separately.

(4) The connection portion 62a of the second passage 62 connected to the tip end 61a of the first passage 61 and the connection portion 63a of the third passage 63 connected to the tip end 61a of the first passage 61 are arranged side by side. The valve body 72 is arranged in a manner that allows displacement of the valve body 72 in a direction in which the second and third connection portions 62a and 63b of the second and third passages 62 and 63 are arranged. The connection portion 62a of the second passage 62 is located to be closer to a side at which the valve body 72 is closed than the third connection portion 63a of the third passage 63. Specifically, the change mechanism 70 has three modes changed in accordance with the position of the valve body 72. In the first mode, connection between the first and second passages 61 and 62 and connection between the first and third passages 61 and 63 are both cut. In the second mode, while connection between the first and third passages 61 and 63 is cut, the degree of connection between the first and second passages 61 and 62 is changed continuously in accordance with the position of the valve body 72. In the third mode, while the degree of connection between the first and second passages 61 and 62 is at its maximum, the degree of connection between the first and third passages 61 and 63 is changed continuously in accordance with the position of the valve body 72. This structure restrains a large amount of blow-by gas from flowing back to the upstream section 10a of the intake passage 10 while allowing a large amount of compressed gas to flow back to the upstream section 10a of the intake passage 10 through the third passage 63 with the intention of preventing surging of the compressor 22.

(5) The third passage 63 has a flow passage area larger than that of the second passage 62. According to this structure, changing the second mode to the third mode by displacing the valve body 72 toward a side at which the valve body 72 is opened rapidly increases the flow rate of compressed gas to flow back through the first and third passages 61 and 63, and rapidly reduces the flow rate of compressed gas to flow back through the second passage 62.

(6) The connection portion 62a of the second passage 62 has an elongated shape extending in a direction in which the valve body 72 is displaced. This structure allows fine adjustment of the degree of connection between the first and second passages 61 and 62 in accordance with the position of the valve body 72. As a result, the flow rate of blow-by gas to flow back through the second passage 62 can be adjusted accurately.

(7) The hollow cooling chamber 29 is formed inside the compressor housing 24 and on the back side of the diffuser surface 26b. The cooling chamber 29 forms part of the second recirculation passage 46 and is located upstream of the second recirculation passage 46 with respect to the second passage 62. More specifically, in the compressor housing 24, the shroud piece 26 with the diffuser surface 26b is separate from the housing body 25. The cooling chamber 29 is formed between the shroud piece 26 and the housing body 25. This structure suppresses the occurrence of a problem in that an upper limit of forced induction pressure will be restricted to a low level due to limits imposed by collection of oil deposits. Further, blow-by gas to flow back to the upstream section 10a of the intake passage 10 becomes lower in temperature, thereby enhancing the efficiency of forced induction. Additionally, the cooling chamber 29 can be formed easily inside the compressor housing 24.

(8) The ejector piece 65 with the nozzle portion 65a is provided between the cooling chamber 29 and the second passage 62. The nozzle portion 65a tapers the second passage 62 such that the second passage 62 gets thinner from the connection portion with the first passage 61 toward a connection portion with the cooling chamber 29. This structure enhances ejector effect so that a larger amount of blow-by gas can be drawn from the inside of the cooling chamber 29 into the second passage 62. This achieves accurate cooling of the inside of the cooling chamber, thereby enabling cooling of the diffuser surface 26b favorably.

An internal combustion engine according to a second embodiment of the present invention will now be described below by referring to FIGS. 5 and 6.

The second embodiment differs from the previously described first embodiment in that the second embodiment has a supply mechanism that is capable of supplying some of compressed gas to be introduced through a first passage to an upstream section of a second recirculation passage with respect to a connection portion between the second recirculation passage and a second passage.

The following mainly describes the difference from the first embodiment. In the description below, components of the second embodiment that are like or the same as corresponding components of the first embodiment are given reference numerals determined by adding 100 to corresponding reference numerals. Description of these components is omitted herein.

Figure 5:
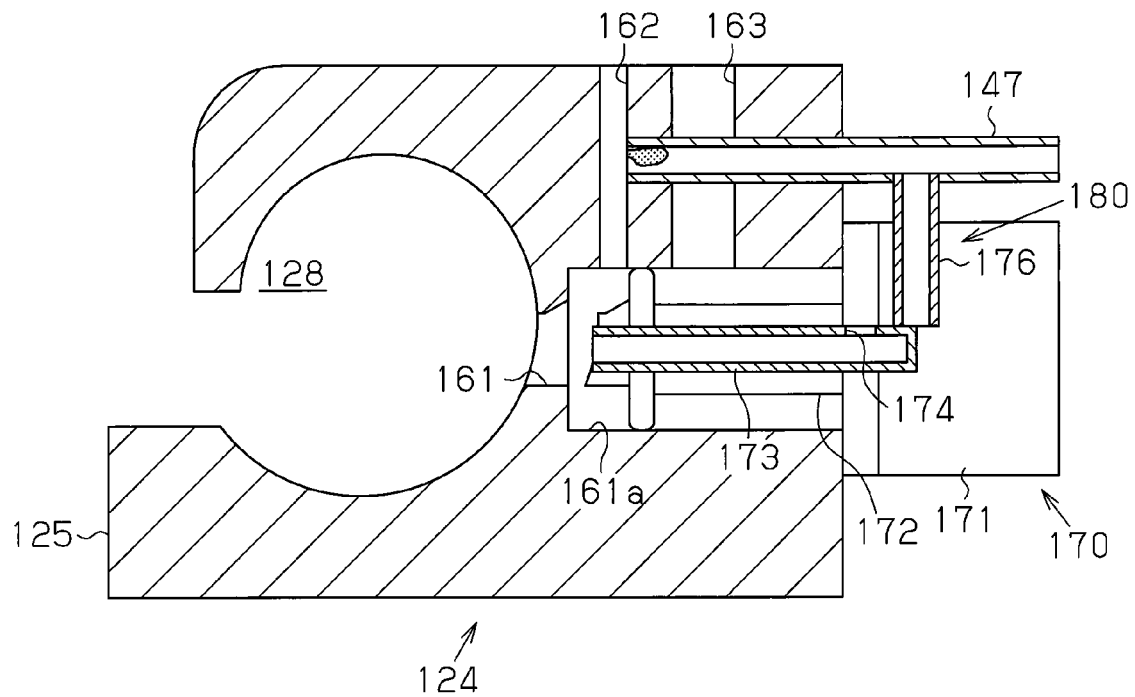
FIG. 5 is a cross-sectional view showing the structure in cross section of a compressor housing of an internal combustion engine according to a second embodiment of this invention.

As shown in FIG. 5, a compressor housing 124 of the second embodiment does not have a cooling chamber. Accordingly, a recirculation pipe 147 is connected directly to a second passage 162.

A branching pipe 176 branches off from part of the recirculation pipe 147. Specifically, the branching pipe 176 branches off from an upstream section of a second recirculation passage 146 with respect to the second passage 162. The tip end of the branching pipe 176 is located inside a change mechanism 170.

A movable pipe 173 is fitted in a valve body 172. The movable pipe 173 communicates with a first passage 161 and extends in the direction in which the valve body 172 is displaced. A circumferential surface of the movable pipe 173 is provided with a communication hole 174 to communicate with the tip end of the branching pipe 176 when the valve body 172 is at a predetermined position, specifically at a position within a region corresponding to a third mode. The predetermined position is determined, for example, through experimentation such that compressed gas to be supplied through the recirculation pipe 147 is placed under intended pressure. Specifically, the change mechanism 170 includes a supply mechanism 180, which supplies some of compressed gas to be introduced through the first passage 161 to the upstream section of the second recirculation passage 146 with respect to a connection portion between the second recirculation passage 146 and the second passage 162 when the valve body 172 is at the predetermined position within the region corresponding to the third mode.

Operation of the second embodiment is described next.

Figure 6A:
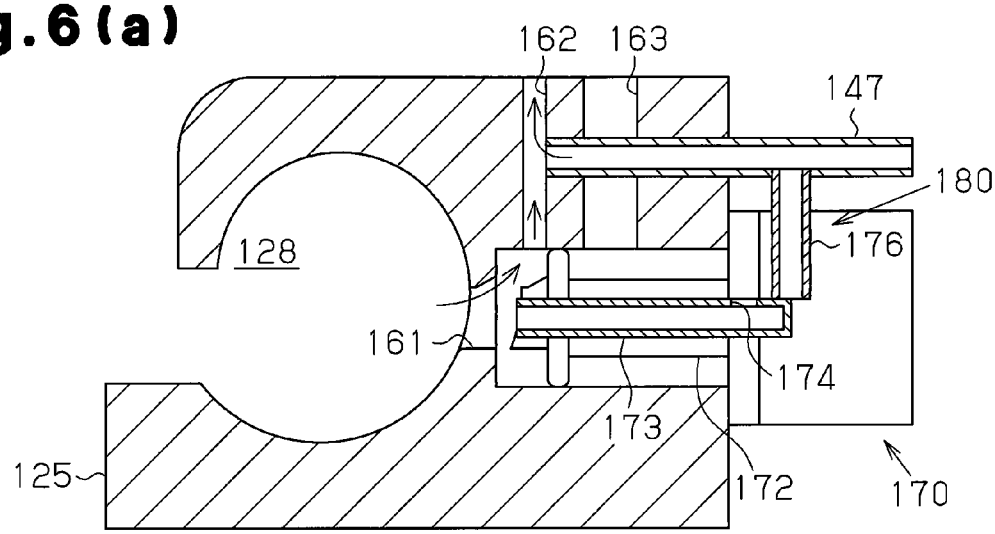
FIG. 6(a) is a cross-sectional view showing the structure in cross section of the compressor housing, when a valve body is closer to a side at which the valve body is closed than a predetermined position.

As shown in FIG. 6(a), when the valve body 172 is at a position within a region corresponding to a second mode and closer to a side at which the valve body 172 is closed than the predetermined position, communication between the movable pipe 173 and the branching pipe 176 is cut off. Accordingly, compressed gas from the first passage 161 is not supplied to the branching pipe 176 but it flows back to the upstream section 10a of the intake passage 10 through the second passage 162.

Figure 6B:
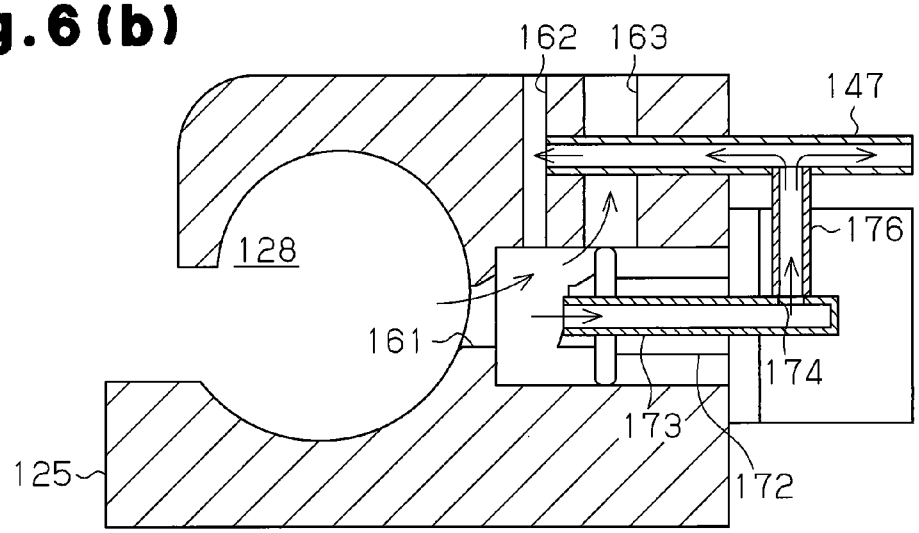
FIG. 6(b) is a cross-sectional view like FIG. 6(a), taken when the valve body is at the predetermined position.

As shown in FIG. 6(b), the valve body 172 at the predetermined position makes communication between the movable pipe 173 and the branching pipe 176. Hence, some of compressed gas from the first passage 161 is supplied through the movable pipe 173 and the branching pipe 176 to the recirculation pipe 147. This removes adherents such as oil inside the recirculation pipe 147.

Figure 6C:
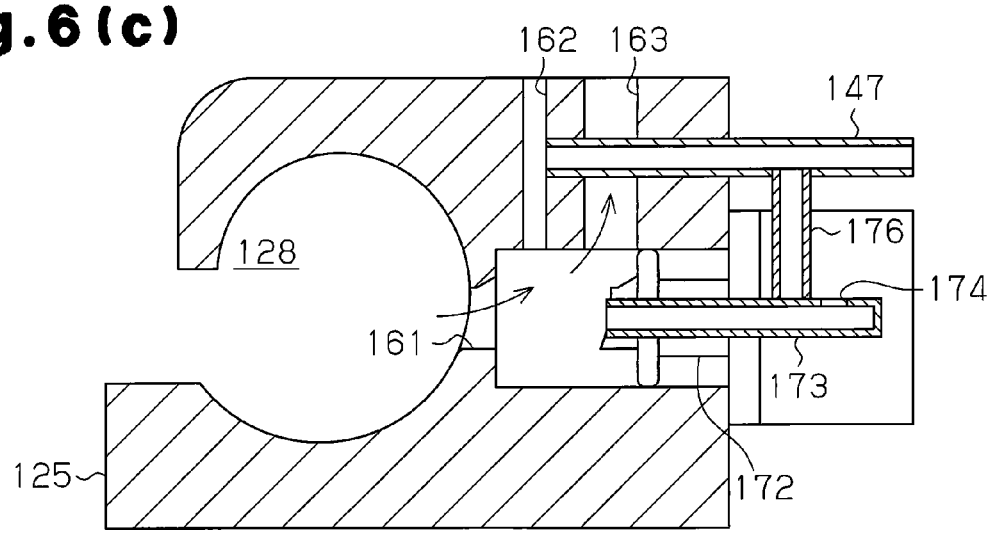
FIG. 6(c) is a cross-sectional view like FIG. 6(a), taken when the valve body is closer to a side at which the valve body is opened than the predetermined position.

As shown in FIG. 6(c), when the valve body 172 is at a position within the region corresponding to the third mode and closer to a side at which the valve body 172 is opened than the predetermined position, communication between the movable pipe 173 and the branching pipe 176 is cut off. Accordingly, compressed gas from the first passage 161 is not supplied to the branching pipe 176, but most of the compressed gas flows back through a third passage 163 to an upstream section with respect to the impeller 30.

The aforementioned internal combustion engine of the second embodiment achieves the following advantage (9) in addition to the previously described advantages (1) to (8) of the first embodiment.

(9) The change mechanism 170 includes the supply mechanism 180, which supplies some of compressed gas to be introduced through the first passage 161 to the upstream section of the second recirculation passage 146 with respect to the connection portion between the second recirculation passage 146 and the second passage 162 when the valve body 172 is at the predetermined position within the region corresponding to the third mode. More specifically, the supply mechanism 180 includes the branching pipe 176 branching off from the upstream section of the second recirculation passage 146 with respect to the second passage 162 and the movable pipe 173 communicating with the first passage 161 and provided integrally with the valve body 172. The valve body 172 at the predetermined position makes communication between the movable pipe 173 and the tip end of the branching pipe 176. This structure can remove an adherent such as oil inside the second recirculation passage 146 at an early stage. Further, the degree of connection between the communication hole 174 of the movable pipe 173 and the branching pipe 176 is changed in accordance with the position of the valve body 172, thereby allowing fine adjustment of the pressure of compressed gas to be supplied through the movable pipe 173 and the branching pipe 176.

The structure of the internal combustion engine of the present invention is not limited to those given as examples in the aforementioned embodiments. The internal combustion engine of the present invention of an appropriately modified structure can be implemented, for example, in the following way.

Each of the aforementioned embodiments does not specifically refer to the position of the third passage 63 or 163 relative to the position of the compressor housing 24 or 124 and the position of the tip end 61a or 161a of the first passage 61 or 161. It is desirable that these relative positions be determined in the manner shown in FIG. 7. FIG. 7(a) is a cross-sectional view showing the structure of a compressor in cross section. FIG. 7(b) is a cross-sectional view showing a structure in cross section taken along line B-B of FIG. 7(a). In FIG. 7, components of the second embodiment that are like or the same as corresponding components of the first embodiment are given reference numerals determined by adding 100 to corresponding reference numerals. Description of these components is omitted herein. As shown in FIG. 7, the inner circumferential surface of a tip end 261a of a first passage 261 and the inner circumferential surface of a housing body 225 are both formed into a circle. A third passage 263 extends along common tangents to these inner circumferential surfaces. According to this structure, compressed gas to flow back through the third passage 263 to the upstream section 10a of the intake passage 10 circulates in a direction of rotation C of the impeller 30, thereby enhancing the efficiency of forced induction.

In each of the aforementioned embodiments, the labyrinth oil separator 49 is provided to the head cover 2a. However, the type and the position of the oil separator 49 are not limited to those illustrated above. As an example, a cyclone oil separator or a filter oil separator are also applicable. These separators may be connected in series or in parallel and may be used in combination.

In the example shown in each of the aforementioned embodiments, the change mechanism 70 drives the valve body 72 by the electrically-operated actuator 71. However, the valve body may also be driven by a different actuator such as a hydraulic actuator or a pneumatic actuator. This also applies to the metering valve 45 provided in the first recirculation passage 44.

In each of the aforementioned embodiments, the connection portion 62a of the second passage 62 has an elongated shape extending in the direction in which the valve body 72 is displaced. This is desirable in terms of accurately adjusting the flow rate of blow-by gas to flow back through the second passage 62. However, this invention is not limited to this shape. The connection portion of the second passage connected to the first passage can have a different shape in cross section such as a circular shape.

In each of the aforementioned embodiments, the change mechanism 70 includes the valve body 72 shared by the second and third passages 62 and 63. This is desirable in terms of simplifying the structure of the change mechanism 70. However, this invention is not limited to this structure. Respective valve bodies may be provided separately for the second and third passages.

In each of the aforementioned embodiments, the first, second, and third passages 61, 62, and 63 are all formed inside the compressor housing 24. This is effective in shortening the length of each of the passages 61, 62 and 63. This is also effective in reducing the number of components. Unless these conditions become matters of concern, each passage can be provided outside the compressor housing.

DESCRIPTION OF THE REFERENCE NUMERALS

2 . . . Cylinder head, 2a . . . Head cover, 4 . . . Cylinder block, 6 . . . Crank case, 10 . . . Intake passage, 12 . . . Intercooler, 14 . . . Throttle valve, 16 . . . Intake manifold, 20 . . . Turbocharger, 22 . . . Compressor, 24, 124, 224 . . . Compressor housing, 25, 125, 225 . . . Housing body, 26 . . . Shroud piece (diffuser portion), 26a . . . Shroud surface, 26b . . . Diffuser surface, 26c . . . Through hole, 27 . . . Stopper member, 28, 128, 228 . . . Scroll passage, 29 . . . Cooling chamber, 30 . . . Impeller, 32 . . . Shaft, 34 . . . Turbine, 40 . . . Blow-by gas recirculation unit, 42 . . . Fresh air introduction passage, 44 . . . First recirculation passage, 45 . . . Metering valve, 46 . . . Second recirculation passage (blow-by gas recirculation passage), 47, 147, 247 . . . Recirculation pipe, 48 . . . Upstream recirculation passage, 49 . . . Oil separator, 50 . . . Air bypass passage, 61, 161, 261 . . . First passage, 61a, 161a, 261a . . . Tip end, 62, 162, 262 . . . Second passage, 62a . . . Second connection portion, 63, 163, 263 . . . Third passage, 63a . . . Third connection portion, 65 . . . Ejector piece, 65a . . . Nozzle portion, 67 . . . Communication hole, 70, 170, 270 . . . Change mechanism, 71, 171, 271 . . . Actuator, 72, 172, 272 . . . Valve body, 173 . . . Movable pipe, 174 . . . Communication hole, 176 . . . Branching pipe, 180 . . . Supply mechanism

The invention claimed is:

1. An internal combustion engine comprising:
   a turbocharger with a compressor that has an impeller arranged in an intake passage and is driven by energy of exhaust gas;
   a blow-by gas recirculation passage, through which blow-by gas flows back to an upstream section, which is upstream of the impeller in the intake passage;
   a first passage, which branches off from a downstream section, which is downstream of the impeller in the intake passage;
   a second passage, which fluidly connects the first passage and the upstream section to each other and forms part of the blow-by gas recirculation passage;
   a third passage, which fluidly connects the first passage and the upstream section to each other, wherein the third passage is provided separately from the second passage; and
   a change mechanism that changes in different manners the flow rate of compressed gas to flow back from the downstream section to the upstream section through the first and second passages and the flow rate of compressed gas to flow back from the downstream section to the upstream section through the first and third passages.

2. The internal combustion engine according to claim 1, wherein
   the compressor has a compressor housing surrounding the impeller, and
   the first, second, and third passages are all formed inside the compressor housing.

3. The internal combustion engine according to claim 1, wherein the change mechanism includes a common valve body shared by the second and third passages.

4. The internal combustion engine according to claim 3, wherein the change mechanism has:
   a first mode, where connection between the first and second passages and connection between the first and third passages are both cut;
   a second mode, where a degree of connection between the first and second passages is changed continuously in accordance with the position of the valve body while connection between the first and third passages is cut; and
   a third mode, where a degree of connection between the first and third passages is changed continuously in accordance with the position of the valve body while a degree of connection between the first and second passages is at its maximum.

5. The internal combustion engine according to claim 4, wherein
   the second and third passages each have a connection portion connected to the first passage,
   the connection portion of the second passage and the connection portion of the third passage are arranged side by side,
   the valve body is provided in a manner that allows displacement of the valve body in the direction in which the connection portions of the second and third passages are arranged, and
   the connection portion of the second passage is closer to a side at which the valve body is closed than the connection portion of the third passage.

6. The internal combustion engine according to claim 5, wherein the third passage has a flow passage area larger than that of the second passage.

7. The internal combustion engine according to claim 5, wherein the connection portion of the second passage has an elongated shape extending in the direction in which the valve body is displaced.

8. The internal combustion engine according to claim 4, wherein
   the blow-by gas recirculation passage has an upstream section that is located upstream of a part to which the second passage is connected, and
   the change mechanism includes a supply mechanism that supplies some of compressed gas introduced through the first passage to the upstream section of the blow-by gas recirculation passage when the valve body is at a predetermined position within a region corresponding to the third mode.

9. The internal combustion engine according to claim 8, wherein the supply mechanism includes:
   a branching pipe, which branches off from the upstream section of the blow-by gas recirculation passage; and
   a movable pipe, which communicates with the first passage and is provided integrally with the valve body,
   wherein, when the valve body is at the predetermined position, the movable pipe communicates with a tip end of the branching pipe.

10. The internal combustion engine according to claim 1, wherein
   the compressor has a compressor housing surrounding the impeller,
   the compressor housing has a diffuser surface exposed to the intake passage and a cooling chamber formed inside the compressor housing and on the back side of the diffuser surface, and
   the cooling chamber forms part of the blow-by gas recirculation passage and is located upstream of the second passage in the blow-by gas recirculation passage.

11. The internal combustion engine according to claim 10, wherein the second passage is provided with a nozzle portion, which tapers the second passage such that the second passage gets thinner from a connection portion between the first and second passages toward a connection portion between the cooling chamber and the second passage.

12. The internal combustion engine according to claim 10, wherein
   the compressor housing has a housing body and a diffuser portion separated from the housing body, the diffuser portion having the diffuser surface, and
   the cooling chamber is formed between the diffuser portion and the housing body.

13. An internal combustion engine comprising:
   a turbocharger with a compressor that has an impeller arranged in an intake passage and is driven by energy of exhaust gas;
   a blow-by gas recirculation passage, through which blow-by gas flows back to an upstream section, which is upstream of the impeller in the intake passage;
   a first passage, which branches off from a downstream section, which is downstream of the impeller in the intake passage;
   a second passage, which connects the first passage and the upstream section to each other and forms part of the blow-by gas recirculation passage;
   a third passage, which connects the first passage and the upstream section to each other, wherein the third passage is provided separately from the second passage; and
   a change mechanism that changes in different manners the flow rate of compressed gas to flow back from the downstream section to the upstream section through the first and second passages and the flow rate of compressed gas to flow back from the downstream section to the upstream section through the first and third passages, wherein
   the change mechanism includes a common valve body shared by the second and third passages, and
   the change mechanism has:
   a first mode, where connection between the first and second passages and connection between the first and third passages are both cut;
   a second mode, where a degree of connection between the first and second passages is changed continuously in accordance with the position of the valve body while connection between the first and third passages is cut; and
   a third mode, where a degree of connection between the first and third passages is changed continuously in accordance with the position of the valve body while a degree of connection between the first and second passages is at its maximum.

* * * * *